US012696019B2

(12) United States Patent
Chang et al.

(10) Patent No.: US 12,696,019 B2
(45) Date of Patent: Jul. 28, 2026

(54) MULTIMEDIA AUXILIARY APPARATUS

(71) Applicant: Luxvisions Innovation Technology Corp. Limited, Guangzhou City (CN)

(72) Inventors: Che-Kai Chang, Guangzhou City (CN); Shu-Hung Liu, Guangzhou City (CN); Wei-Han Wu, Guangzhou City (CN)

(73) Assignee: GUANGZHOU LUXVISIONS INNOVATION TECHNOLOGY LIMITED, Guangzhou City (CN)

( * ) Notice: Subject to any disclaimer, the term of this patent is extended or adjusted under 35 U.S.C. 154(b) by 0 days.

(21) Appl. No.: 19/003,451

(22) Filed: Dec. 27, 2024

(65) Prior Publication Data

US 2026/0122388 A1 Apr. 30, 2026

(30) Foreign Application Priority Data

Apr. 29, 2024 (CN) ......................... 202410535894.8

(51) Int. Cl.
*H04R 1/02* (2006.01)

(52) U.S. Cl.
CPC ......... *H04R 1/025* (2013.01); *H04R 2499/15* (2013.01)

(58) Field of Classification Search
CPC ............................ H04R 1/025; H04R 2499/15
See application file for complete search history.

(56) References Cited

U.S. PATENT DOCUMENTS

| | | | | | |
|---|---|---|---|---|---|
| 4,867,551 | A * | 9/1989 | Perera | G04B 47/00 | 968/398 |
| 6,160,666 | A * | 12/2000 | Rallison | G02B 27/283 | 359/632 |
| 11,607,600 | B2 | 3/2023 | Travers | | |
| 2013/0258270 | A1* | 10/2013 | Cazalet | G02C 5/008 | 351/158 |
| 2015/0261015 | A1* | 9/2015 | Han | G02C 9/04 | 351/158 |
| 2016/0050345 | A1 | 2/2016 | Longbotham et al. | | |
| 2017/0168566 | A1* | 6/2017 | Osterhout | G02B 27/017 | |

(Continued)

FOREIGN PATENT DOCUMENTS

| | | | |
|---|---|---|---|
| CN | 210534440 | U | 5/2020 |
| CN | 117055209 | A | 11/2023 |

(Continued)

*Primary Examiner* — Lunyi Lao

(74) *Attorney, Agent, or Firm* — Birch, Stewart, Kolasch & Birch, LLP

(57) ABSTRACT

A multimedia auxiliary apparatus includes a frame body, an auxiliary display assembly, a speaker module, and a clamp. The frame body has a first support and two second supports. The two second supports are respectively connected to two sides of the first support. The auxiliary display assembly is fixed to a side of the first support, and includes a multimedia processing module and a projection lens. The multimedia processing module is configured to generate an image signal and a sound signal based on a multimedia signal. The projection lens is configured to receive a projection of the image signal. The speaker module is fixed to one of the two second supports, and is configured to play the sound signal. The clamp is fixed to one of the two second supports, and is located between the auxiliary display assembly and the speaker module.

10 Claims, 7 Drawing Sheets

(56) References Cited

U.S. PATENT DOCUMENTS

| | | | | |
|---|---|---|---|---|
| 2018/0173017 | A1* | 6/2018 | Imagawa | G02B 27/0176 |
| 2022/0296421 | A1* | 9/2022 | Leland | G02C 11/00 |
| 2023/0188880 | A1 | 6/2023 | Fu et al. | |
| 2024/0201501 | A1* | 6/2024 | Hasegawa | G02B 27/0172 |

FOREIGN PATENT DOCUMENTS

| | | | | |
|---|---|---|---|---|
| HU | P1000588 | A2 * | 5/2011 | |
| TW | 202121360 | A | 6/2021 | |
| WO | WO-2017104219 | A1 * | 6/2017 | G02B 27/02 |
| WO | 2021/050392 | A1 | 3/2021 | |
| WO | WO-2022134982 | A1 * | 6/2022 | G02B 27/0176 |

* cited by examiner

MULTIMEDIA AUXILIARY APPARATUS

CROSS-REFERENCE TO RELATED APPLICATION

This non-provisional application claims priority under 35 U.S.C. § 119(a) to Patent Application No. 202410535894.8 filed in China on Apr. 29, 2024, the entire contents of which are hereby incorporated by reference.

BACKGROUND

Technical Field

The present invention relates to a multimedia auxiliary apparatus, and in particular, to a multimedia auxiliary apparatus that is externally fixed to glasses and configured to receive and play a multimedia signal to assist the glasses in performing an augmented reality operation.

Related Art

Currently, a near-eye display device may be worn on a head of a user. The user may view an image through the near-eye display device. However, the near-eye display device can only project image information onto lenses and cannot process sound information currently, which causes an operation performed by the user on the near-eye display device to be excessively single. In addition, the user cannot simultaneously wear glasses and the near-eye display device. If a user suffers from shortsightedness, the user may not be able to clearly see the image information displayed by the near-eye display device.

SUMMARY

In view of this, a multimedia auxiliary apparatus is provided, including a frame body, an auxiliary display assembly, a speaker module, and a clamp. The frame body has a first support and two second supports. The two second supports are respectively connected to two sides of the first support. The auxiliary display assembly is fixed to a side of the first support, and includes a multimedia processing module and a projection lens. The multimedia processing module is configured to generate an image signal and a sound signal based on a multimedia signal. The image signal is projected onto the projection lens. The speaker module is fixed to one of the two second supports, and is configured to play the sound signal. The clamp is fixed to one of the two second supports, and is located between the auxiliary display assembly and the speaker module.

In some embodiments, the clamp includes two clamping plates. A gap is defined between the two clamping plates. The gap has an assembly direction. The projection lens extends from the multimedia processing module based on a same direction as the assembly direction.

In some embodiments, one of the two clamping plates has a signal transmission portion configured to transmit the multimedia signal to the multimedia processing module.

In some embodiments, an elastic member is connected to one of the two clamping plates. The elastic member is located in the gap.

In some embodiments, the speaker module has a sound outlet portion. The sound outlet portion has a playing direction. The playing direction is perpendicular to the assembly direction.

In some embodiments, the auxiliary display assembly further includes another multimedia processing module and another projection lens. Two multimedia processing modules are respectively fixed to two sides of the first support, and are configured to generate image signals and sound signals. The image signals are respectively projected onto two projection lenses located on the two sides of the first support.

In some embodiments, the multimedia auxiliary apparatus further includes another speaker module. The another speaker module is fixed to the other of the two second supports and is configured to play the sound signal.

In some embodiments, the multimedia auxiliary apparatus further includes another clamp. The another clamp is fixed to the other of the two second supports, and is located between the another multimedia processing module and the another speaker module.

In some embodiments, the another clamp includes two clamping plates. A gap is defined between the two clamping plates. The gap has an assembly direction. The projection lens extends from the multimedia processing module toward the assembly direction. The another projection lens extends from the another multimedia processing module toward the assembly direction.

In some embodiments, a first distance is defined between the clamp and the multimedia processing module. A second distance is defined between the another clamp and the another multimedia processing module. The first distance is substantially equal to the second distance.

Based on the above, in some embodiments, the multimedia auxiliary apparatus may be fixed to glasses through the clamp, so that a user views the image signal projected onto the projection lens. After the multimedia auxiliary apparatus is fixed to the glasses, the projection lens is arranged at a position corresponding to a spectacle frame, so that the user may view the image signal of the projection lens through the glasses. In addition, the speaker module may be arranged adjacent to an ear of the user, so that the user may listen to the sound signal played by the speaker module. In this way, the user may fix the multimedia auxiliary apparatus to the glasses when wearing the glasses, to obtain the image signal and/or the sound signal to perform an operation of an augmented reality conference.

The present invention is described in detail below with reference to the accompanying drawings and specific embodiments, which are not intended to constitute a limitation on the present invention.

DETAILED DESCRIPTION

Technical solutions of the present invention are described in detail below with reference to the accompanying drawings and specific embodiments, to further understanding objectives, solutions, and effects of the present invention, but are not intended to constitute a limitation on the protection scope of the appended claims of the present invention.

Figure 1:
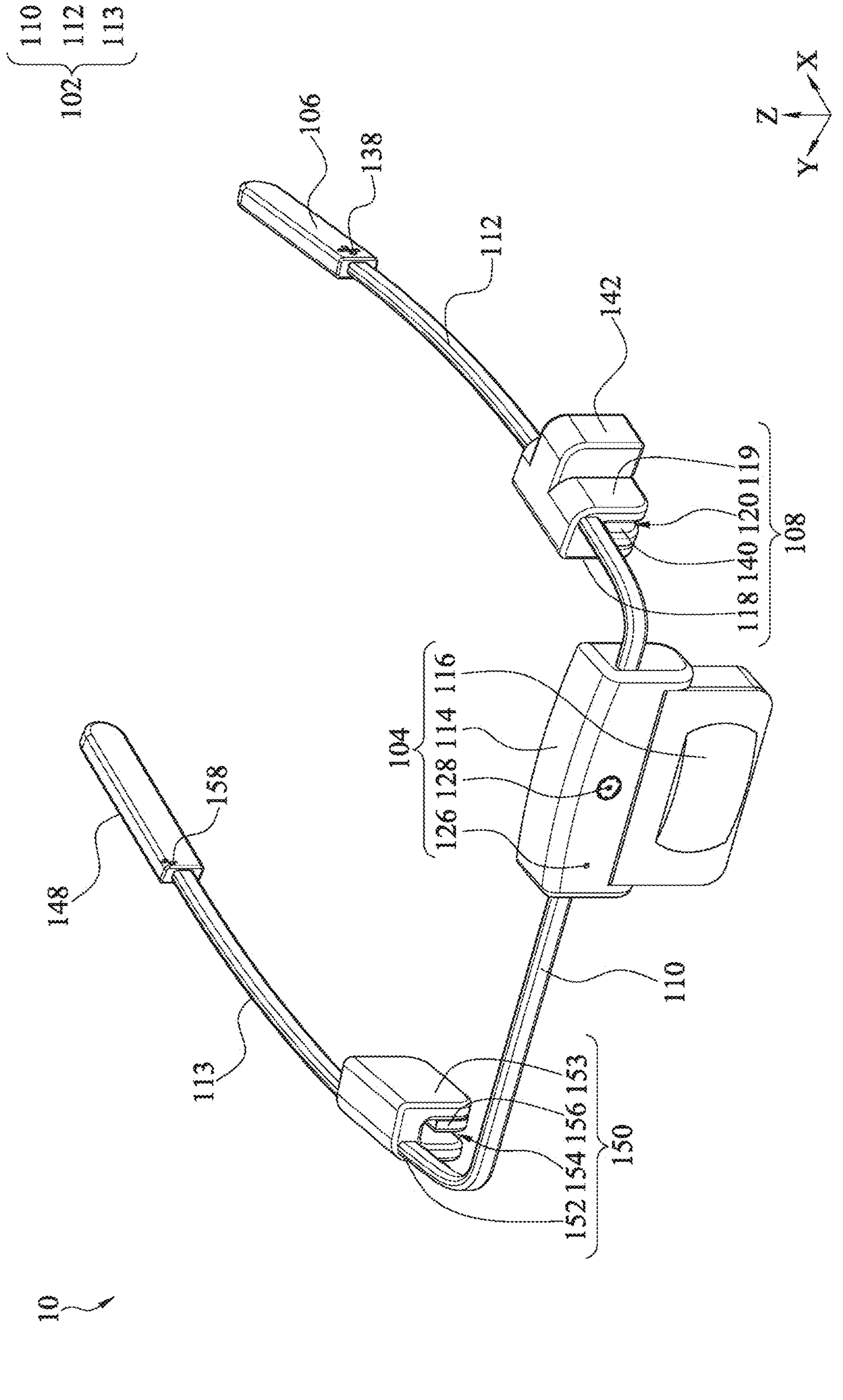
FIG. 1 is a three-dimensional view of a multimedia auxiliary apparatus according to some embodiments of the present invention.
Figure 2:
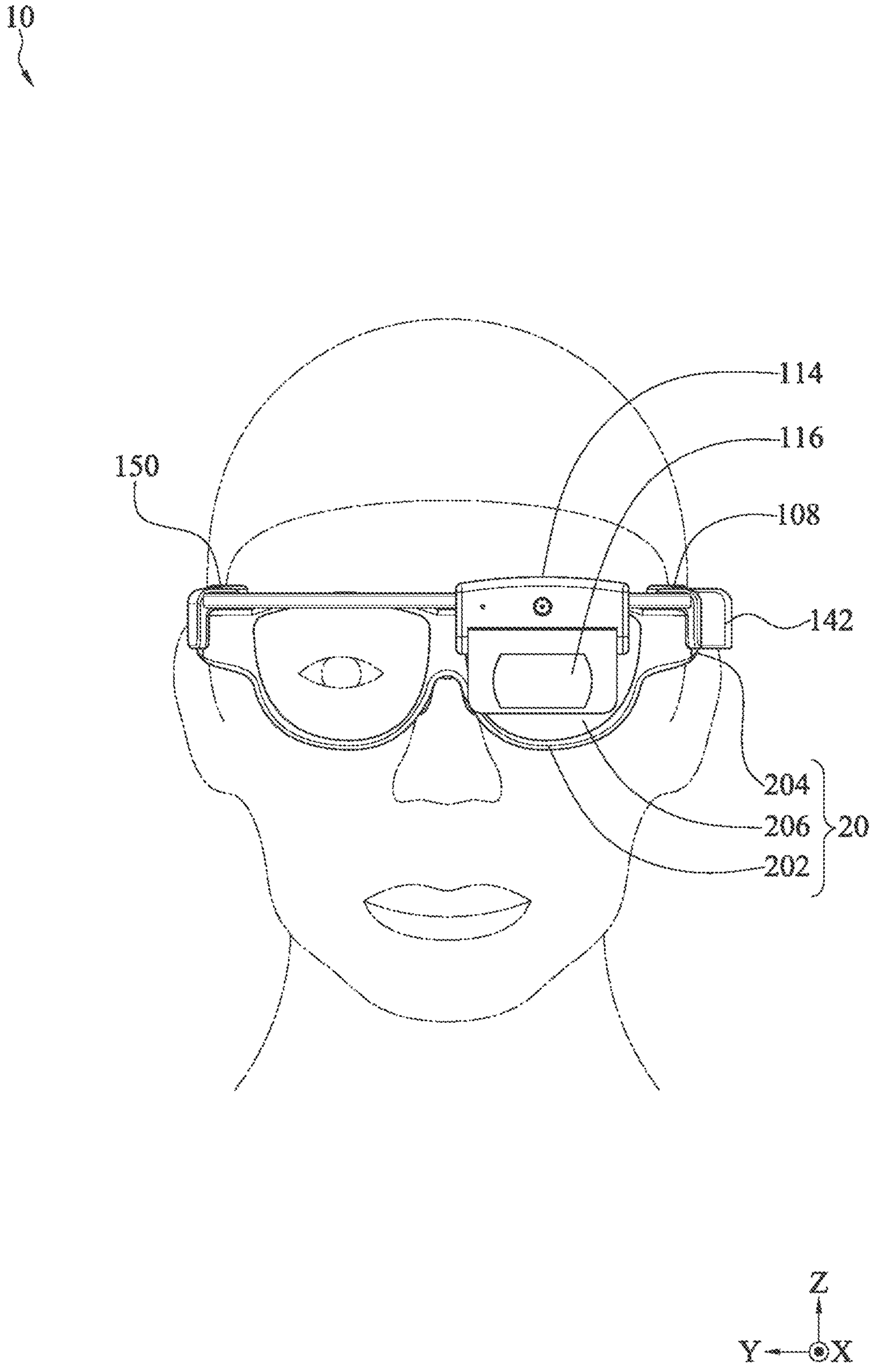
FIG. 2 is a schematic diagram showing completion of assembly of a multimedia auxiliary apparatus and glasses according to some embodiments of the present invention.
Figure 3:
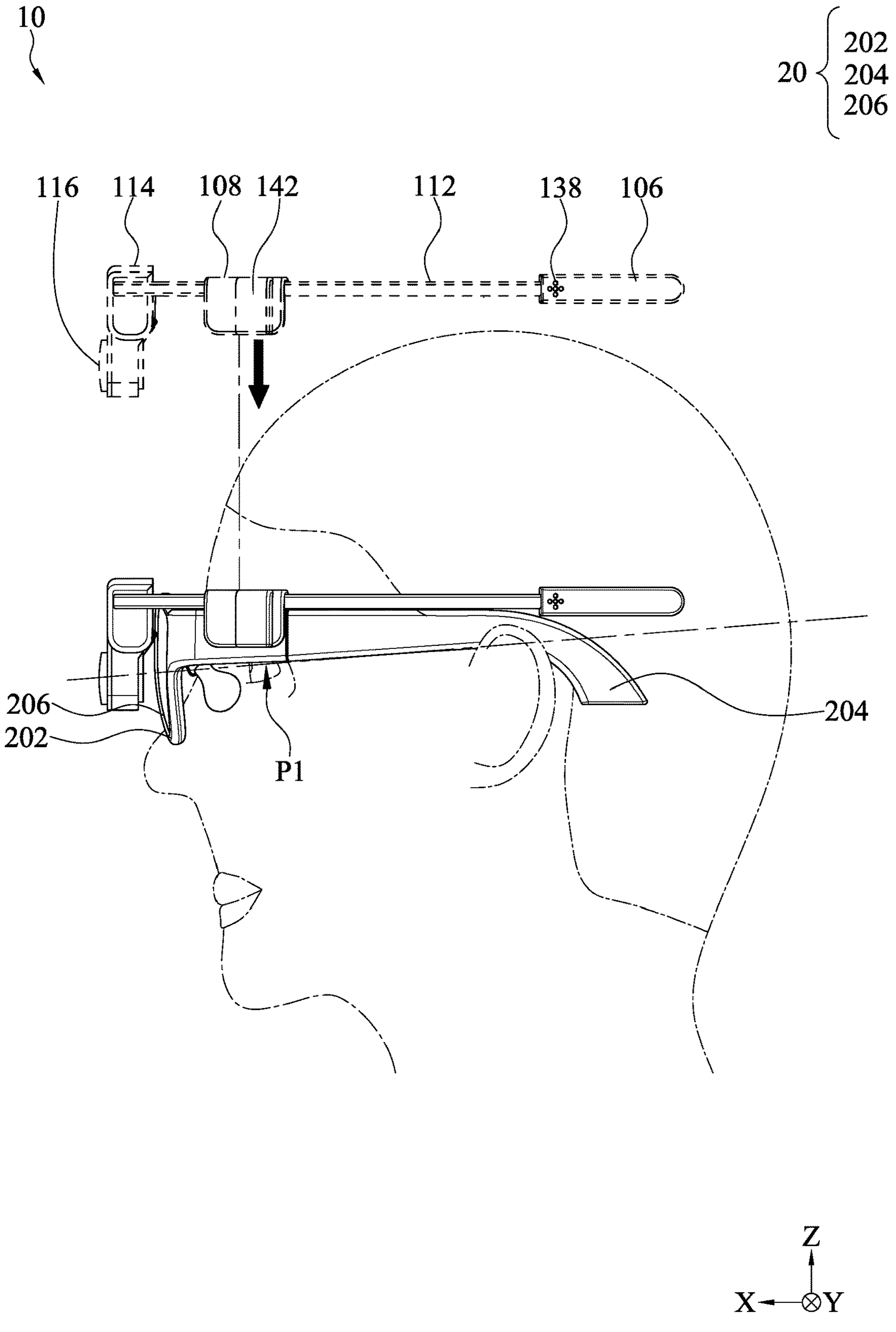
FIG. 3 is a schematic diagram of implementation of FIG. 2 viewed from a side perspective.

Refer to FIG. 1, FIG. 2, and FIG. 3 together. FIG. 1 is a three-dimensional view of a multimedia auxiliary apparatus according to some embodiments of the present invention. FIG. 2 is a schematic diagram showing completion of assembly of a multimedia auxiliary apparatus and glasses according to some embodiments of the present invention. FIG. 3 is a schematic diagram of implementation of FIG. 2 viewed from a side perspective. As shown in FIG. 1, FIG. 2, and FIG. 3, a multimedia auxiliary apparatus 10 includes a frame body 102, an auxiliary display assembly 104, a speaker module 106, and a clamp 108. The frame body 102 has a first support 110 and two second supports (112, 113). The second supports (112, 113) are respectively connected to two sides of the first support 110. The auxiliary display assembly 104 is fixed to a side of the first support 110. The auxiliary display assembly 104 includes a multimedia processing module 114 and a projection lens 116. The multimedia processing module 114 is configured to generate an image signal and a sound signal based on a multimedia signal. The projection lens 116 is configured to receive a projection of the image signal. The speaker module 106 is fixed to one of the two second supports (112, 113), and is configured to play the sound signal. The clamp 108 is fixed to one of the two second supports (112, 113), and is located between the auxiliary display assembly 104 and the speaker module 106.

The frame body 102 may be fixed to glasses 20 through the clamp 108, so that the auxiliary display assembly 104 and the speaker module 106 may be externally hung on a human head (described later). When the frame body 102 and the glasses 20 are mounted (as shown in FIG. 3), the first support 110 corresponds to a spectacle frame 202 arranged on the glasses 20, and the two second supports (112, 113) respectively correspond to two temples 204 arranged on the glasses 20. In some embodiments, the first support 110 and the second supports (112, 113) have a wire slot (not shown in the figure) inside. When the multimedia processing module 114 is connected to the speaker module 106 by a connection wire (not shown in the figure), the connection wire may be buried in the wire slot. In some embodiments, the first support 110 and the two second supports (112, 113) may be integrally formed. The two second supports (112, 113) may also be detached from and mounted to the first support 110.

The speaker module 106 is electrically connected to the multimedia processing module 114 to receive and play the sound signal. As shown in FIG. 3, the speaker module 106 may be embedded in the second support 112 (or the second support 113), so that the speaker module 106 may perform playing toward an ear of a user (the speaker module 106 may be arranged adjacent to the ear of the user). The speaker module 106 may be, for example, a voice coil speaker, a ribbon speaker, an electrostatic speaker, a piezoelectric speaker, a bone conduction transducer, a cartilage conduction transducer, a tragus vibration transducer, and/or any other suitable type or form of audio signal transducer.

The clamp 108 may clamp each of the temples 204, so that the multimedia auxiliary apparatus 10 may be assembled to the glasses 20. In some embodiments, the clamp 108 includes two clamping plates (118, 119). A gap 120 is defined between the two clamping plates (118, 119). The gap 120 has an assembly direction (such as a Z-axis direction in FIG. 3). The clamp 108 may be assembled to the temple 204 based on the assembly direction of the gap 120, to fix the multimedia auxiliary apparatus 10 to the glasses 20. In some embodiments, the two clamping plates (118, 119) have elasticity and change a size of the gap 120 through the elasticity. For example, the size of the gap 120 may be equal to or less than a width of the temple 204. When the clamp 108 contacts the temple 204, the temple 204 may prop open and get embedded in the gap 120. It should be noted that when the temple 204 is located in the gap 120, the gap 120 may squeeze the temple 204 to prevent the multimedia auxiliary apparatus 10 from falling off the temple 204.

Figure 4:
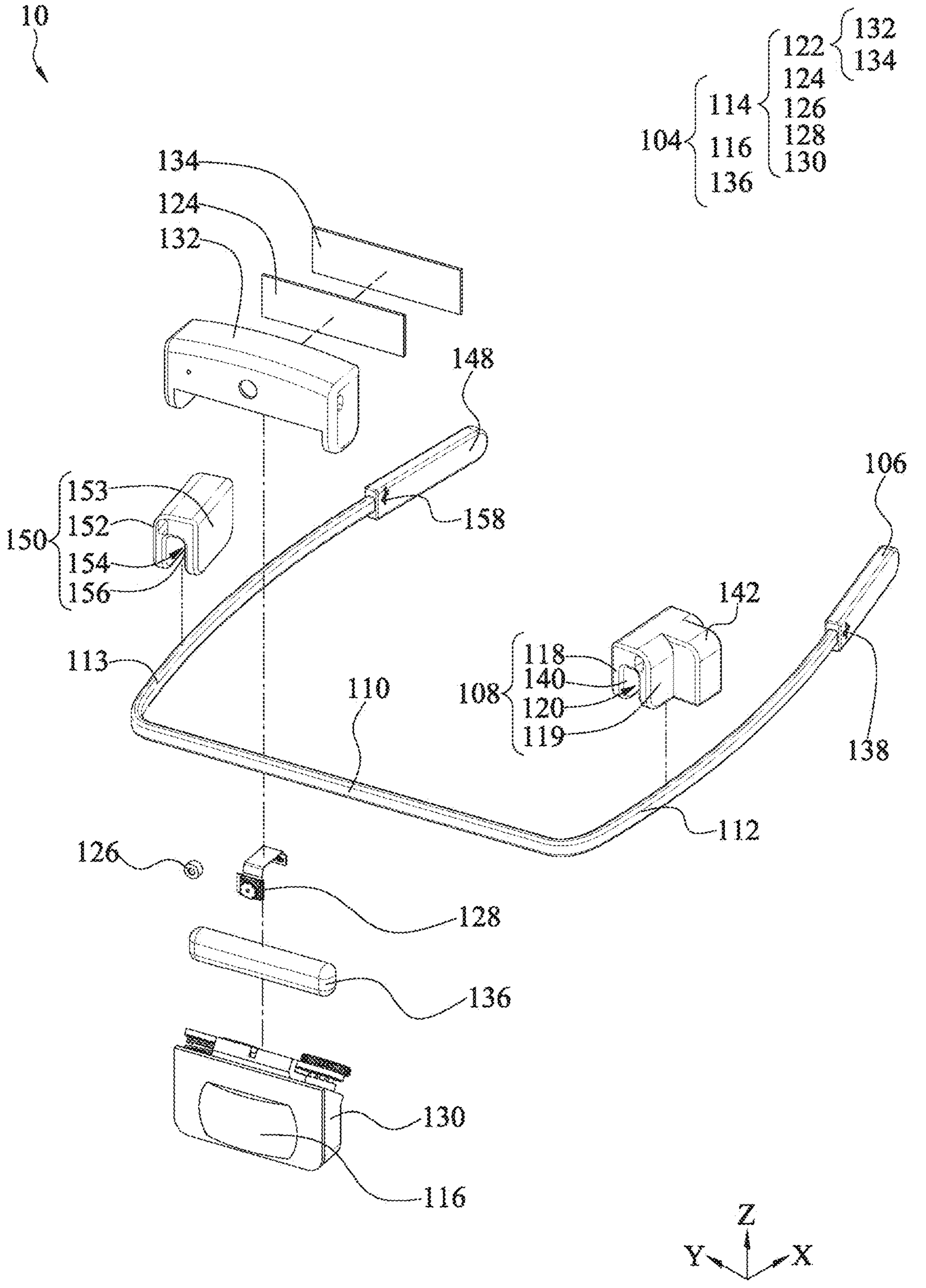
FIG. 4 is an exploded view of an auxiliary display assembly according to some embodiments of the present invention.

Refer to FIG. 1, FIG. 2, FIG. 3, and FIG. 4 together. FIG. 4 is an exploded view of an auxiliary display assembly according to some embodiments of the present invention. As shown in FIG. 1, FIG. 2, FIG. 3, and FIG. 4, in some embodiments, the multimedia processing module 114 includes a housing 122, a processing circuit 124, a sound capturing module 126, an image capturing module 128, and a projection module 130. The housing 122 further includes a first housing 132 and a second housing 134. The first housing 132 may be fixed to the first support 110. The projection lens 116 extends from the multimedia processing module 114 based on a same direction as the assembly direction, which may mean that a side of the projection lens 116 is fixed to the first housing 132 and extends toward a negative Z-axis direction in FIG. 4. After the first housing 132 and the second housing 134 are assembled with each other, an accommodating portion is arranged between the first housing 132 and the second housing 134. The processing circuit 124 and the projection module 130 may be arranged in the accommodating portion. The processing circuit 124 may analyze the multimedia signal to obtain the image signal and the sound signal. The projection module 130 may convert the image signal into a to-be-projected image, and project the to-be-projected image onto the projection lens 116. The user may view a projected image through the projection lens 116. It should be noted that the multimedia auxiliary apparatus 10 is fixed to the glasses 20, and the projection lens 116 is located in front of the spectacle frame 202 of the glasses 20. Therefore, the user may view the projected image through a lens 206 embedded in the spectacle frame 202, so that the user may clearly view the projected image. The lens 206 has a focal position P1. The assembly direction is a direction substantially perpendicular to a plane formed by the two second supports (112, 113) and substantially parallel to the gap 120. The projection lens 116 is a light-transmission lens. The light-transmission lens covers a major part of the corresponding the lens 206, so that an optical center of the glasses lens, a center of the light-transmission lens, and the focal position P1 are substantially aligned. When viewing the projection lens 116, the user may simultaneously see the projected image and an environment picture, to form an augmented reality scene.

The sound capturing module 126 is embedded in the first housing 132, and is configured to generate and send ambient sound information based on an ambient sound. The image capturing module 128 is embedded in the first housing 132, and is configured to generate and send ambient image information based on an ambient image. The processing circuit 124 may send the ambient sound information and the ambient image information through a network for a remote apparatus to receive. In some embodiments, the auxiliary display assembly 104 further includes a power supply module 136. The power supply module 136 is arranged in the accommodating portion, and supplies power to the processing circuit 124, the sound capturing module 126, the image capturing module 128, and the projection module 130. The power supply module 136 may be, for example, a battery or a power conversion circuit. The power conversion circuit may capture external power source, and convert the external power into power that may be used by the multimedia processing module 114.

As shown in FIG. 3 again, in some embodiments, the speaker module 106 has a sound outlet portion 138. The sound outlet portion 138 has a playing direction. The playing direction is perpendicular to the assembly direction (as shown in FIG. 3, the sound signal is played in a Y-axis direction), so that the sound signal may be played around the ear of the user. Specifically, the speaker module 106 may play the sound signal through the sound outlet portion 138. After the multimedia auxiliary apparatus 10 is fixed to the glasses 20, the sound outlet portion 138 is adjacent to a position of the ear of the user, so that the user clearly hears content of the sound signal. In some embodiments, the speaker module 106 is a directional speaker. Energy of sound information may be concentrated in the playing direction. The sound outlet portion 138 may be arranged in a position of the speaker module 106 at another angle, so that the playing direction may be the same as the assembly direction (as shown in FIG. 3, the sound signal is played in a Z-axis direction). If the playing direction is the same as the assembly direction, the sound signal may be played directly toward the ear of the user, to reduce energy consumption of the speaker module 106 and reduce a burden of listening to the sound signal by the user.

In some embodiments, an elastic member 140 is connected to one of the two clamping plates (118, 119). The elastic member 140 is located in the gap 120. When the multimedia auxiliary apparatus 10 is fixed to the glasses 20, a friction force may be generated between the elastic member 140 and the temple 204, to increase a clamping force of the clamp 108 on the temple 204. In some embodiments, more than two elastic members 140 may also be respectively connected to the clamping plates (118, 119). Two elastic members 140 are located in the gap 120.

Figure 5:
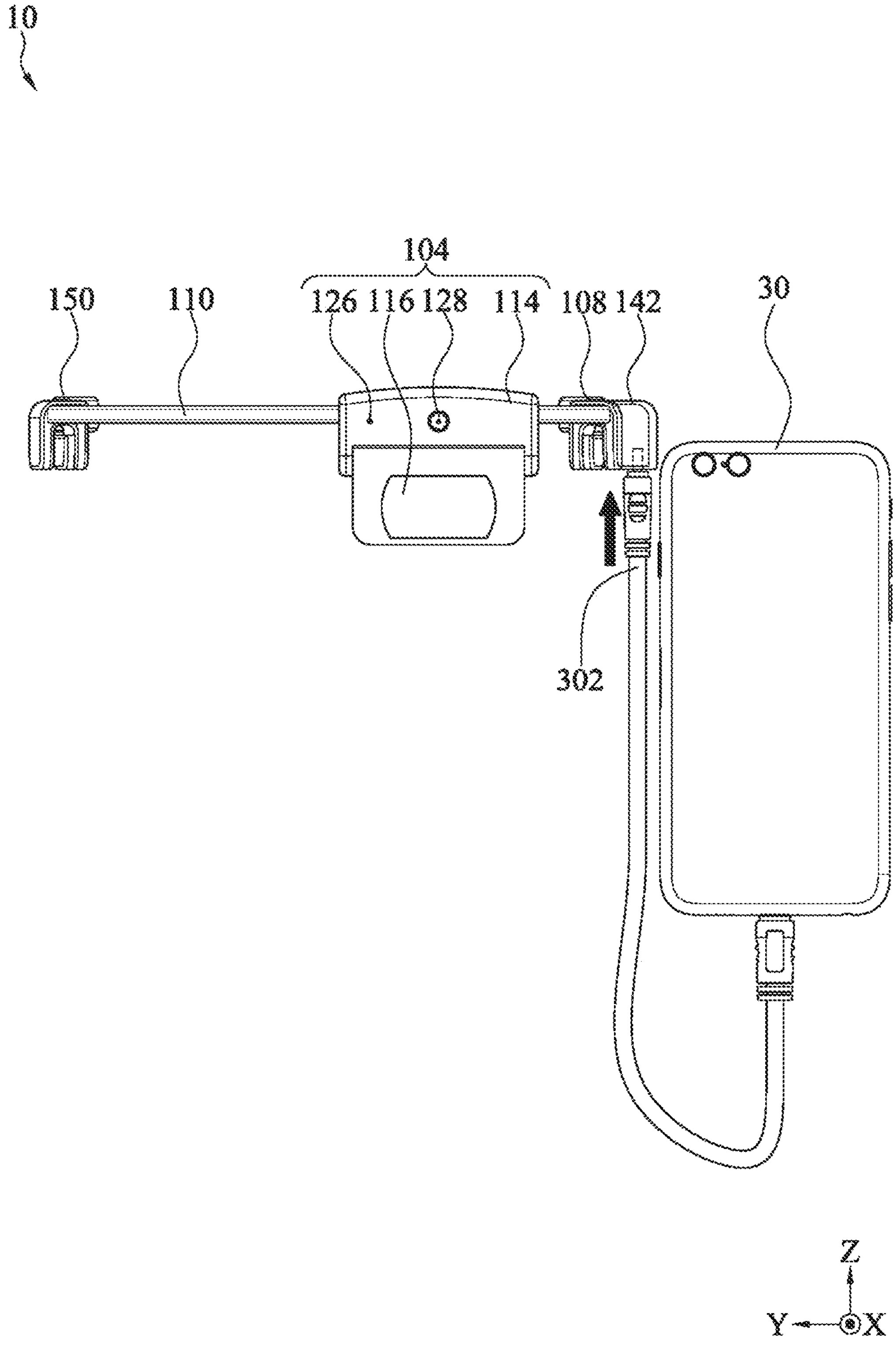
FIG. 5 is a schematic diagram of a multimedia auxiliary apparatus connected to a mobile communication apparatus according to some embodiments of the present invention.

Referring to FIG. 5, FIG. 5 is a schematic diagram of a multimedia auxiliary apparatus connected to a mobile communication apparatus according to some embodiments of the present invention. In some embodiments, one of the clamping plates (118, 119) has a signal transmission portion 142. The signal transmission portion 142 is configured to transmit a multimedia signal to the multimedia processing module 114. The signal transmission portion 142 may be a transmission interface, which may be connected to a signal connection wire 302 of a mobile communication apparatus 30, so that the mobile communication apparatus 30 may transmit the multimedia signal to the multimedia processing module 114 through the signal transmission portion 142. The transmission interface may be, for example, a universal serial bus (USB), a high definition multimedia interface (HDMI), a parallel interface, or a serial interface. The signal transmission portion 142 may also be a wireless transmission circuit. The mobile communication apparatus 30 may transmit the multimedia signal to the multimedia processing module 114 through a wireless transmission technology. The wireless transmission circuit may be, for example, a circuit having a Bluetooth, Wi-Fi, or ZigBee transmission chip.

As shown in FIG. 5 again, in some embodiments, an example in which the signal transmission portion 142 is the transmission interface is used. The signal transmission portion 142 has a connection direction. The connection direction may be the same as the assembly direction (the connection direction is parallel to the assembly direction), so that the signal connection wire 302 is connected to the signal transmission portion 142 along a Z-axis direction in FIG. 5. The connection direction may also be perpendicular to the assembly direction, so that the signal connection wire 302 is connected to the signal transmission portion 142 along a Y-axis direction in FIG. 5.

Figure 6:
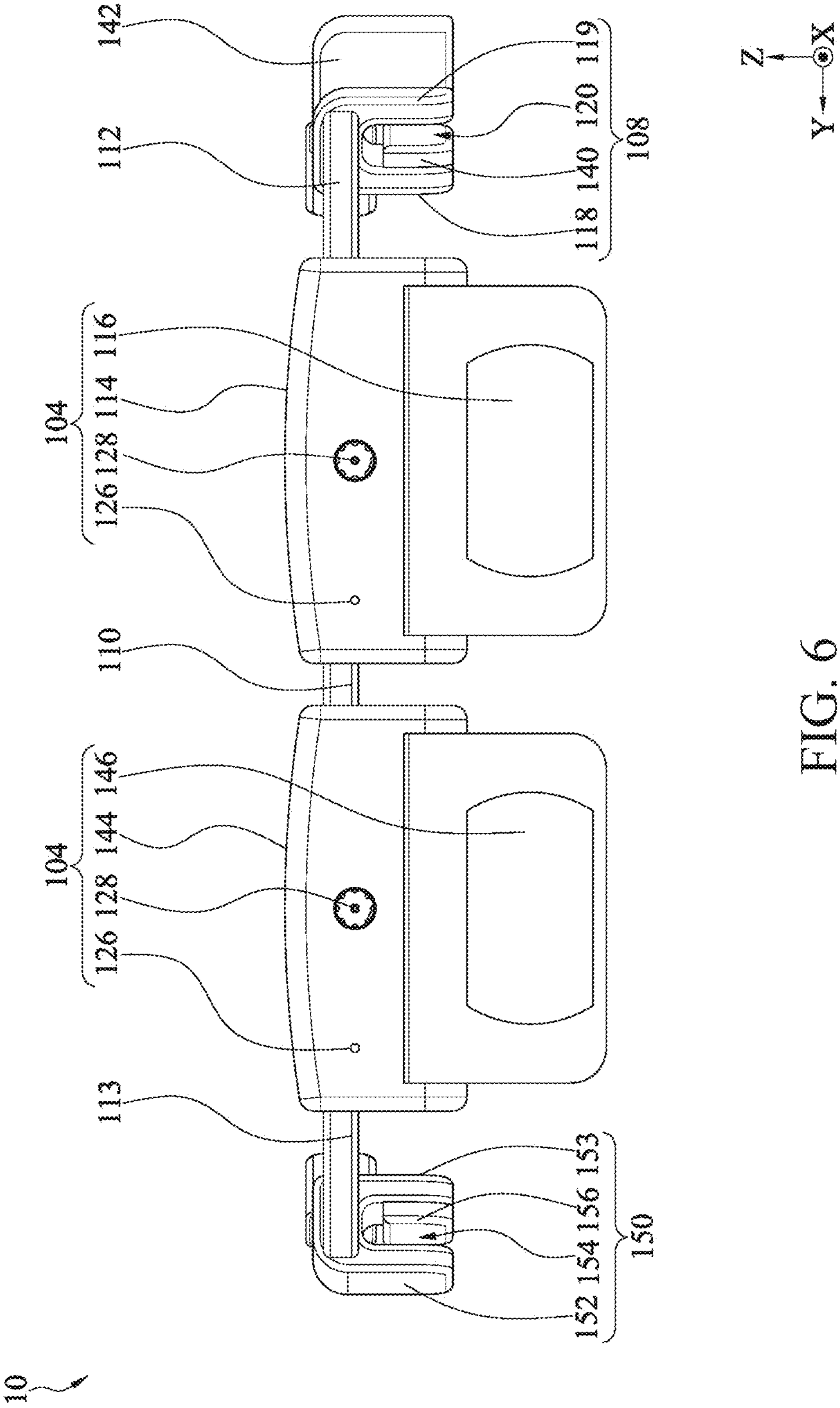
FIG. 6 is a front view of a multimedia auxiliary apparatus according to some other embodiments of the present invention.
Figure 7:
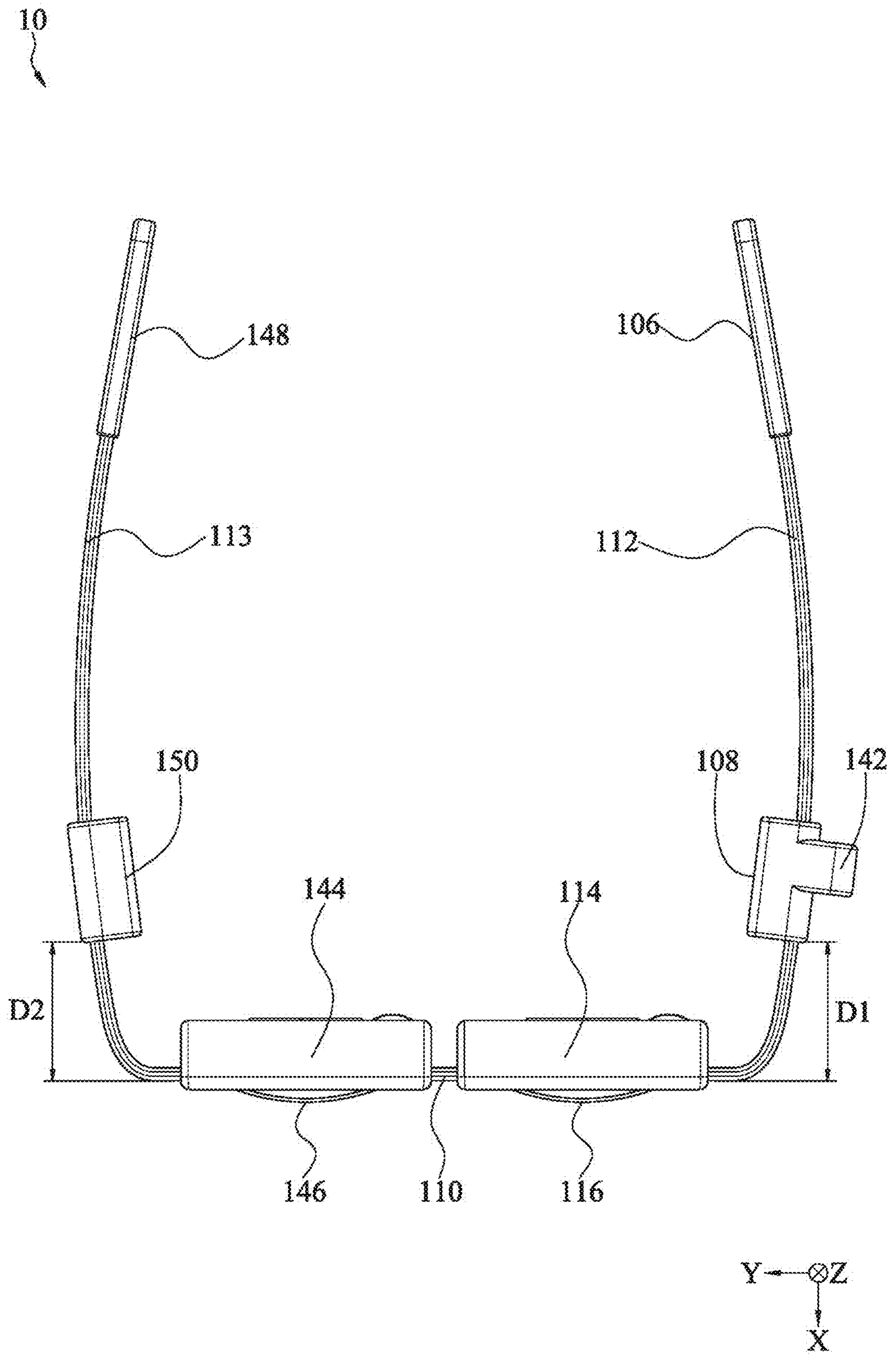
FIG. 7 is a schematic diagram of implementation of FIG. 6 viewed from a top-down perspective.

Refer to FIG. 1, FIG. 6, and FIG. 7 together. FIG. 6 is a front view of a multimedia auxiliary apparatus according to some other embodiments of the present invention. FIG. 7 is a schematic diagram of implementation of FIG. 6 viewed from a top-down perspective. As shown in FIG. 1, FIG. 6, and FIG. 7, the auxiliary display assembly 104 further includes another multimedia processing module 144 and another projection lens 146. The multimedia processing module 144 is fixed to an other side of the first support 110, and is configured to generate an image signal and a sound signal. The projection lens 146 is configured to receive a projection of the image signal. Two multimedia processing modules (114, 144) may have a same structure and function (refer to the foregoing description of the multimedia processing module 114). An image signal from a same source may be transmitted to the two multimedia processing modules (114, 144), so that the two multimedia processing modules (114, 144) may play the image signal from the same source at the same time or at different times. A video conference is used as an example. The image signal may include a conference video image and a presentation image. The multimedia processing module 114 may project the conference video image onto the projection lens 116. The multimedia processing module 144 may project the presentation image onto the projection lens 146. In this way, the user may simultaneously view the conference video image and the presentation image, to perform an operation of an augmented reality conference. The two multimedia processing modules (114, 144) may also simultaneously play one of the conference video image and the presentation image.

In some embodiments, two projection lenses (116, 146) respectively correspond to positions of two spectacle frames 202. Both eyes of the user may view, through the glasses 20, the image signals projected by the projection lenses (116, 146). In some embodiments, the two projection lenses (116, 146) both extend in a same direction. For example, the projection lens 116 extends from the multimedia processing module 114 toward the assembly direction (such as a negative Z-axis direction in FIG. 6), and the projection lens 146 extends from the multimedia processing module 144 toward the assembly direction. After the multimedia auxiliary apparatus 10 is fixed to the glasses 20, the two projection lenses (116, 146) may be respectively arranged in the positions of the two spectacle frames 202.

The multimedia auxiliary apparatus 10 further includes another speaker module 148. The speaker module 148 is fixed to the second support 113, and is configured to play the sound signal. The two speaker modules (106, 148) may have a same structure and function (refer to the foregoing description of the speaker module 106). A sound signal from a same source may be transmitted to the two speaker modules (106, 148), so that the two speaker modules (106, 148) may play the sound signal from the same source at the same time or at different times. A video conference is used as an example. The multimedia processing module 114 may respectively transmit sound signals in left and right channels to the two speaker modules (106, 148) for playing.

As shown in FIG. 6 again, in some embodiments, the multimedia auxiliary apparatus 10 further includes another clamp 150. The clamp 150 is fixed to the second support 113, and is located between the multimedia processing module 144 and the speaker module 148. As shown in FIG. 7, in some embodiments, a first distance D1 is defined between the clamp 150 and the multimedia processing module 114. A second distance D2 is defined between the clamp 150 and the multimedia processing module 144. The first distance D1 is substantially equal to the second distance D2. In this way, the two clamps (108, 150) may equally share weights of the two multimedia processing modules (114, 144) and keep balance. The two clamps (108, 150) and a nose pad (not shown in the figure) of the glasses 20 may form a three-point support, so that when the multimedia auxiliary apparatus 10 is fixed to the glasses 20, the multimedia auxiliary apparatus 10 may be maintained at a fixed angle with respect to the glasses 20.

As shown in FIG. 1 and FIG. 6 again, in some embodiments, the clamp 150 includes two clamping plates (152, 153). A gap 154 is defined between the two clamping plates (152, 153). The gap 120 between the two clamping plates (118, 119) and the gap 154 between the two clamping plates (152, 153) may have a same assembly direction. The two gaps (120, 154) may be respectively mounted to the two temples 204 based on the same assembly direction, so as to fix the multimedia auxiliary apparatus 10 to two sides of the glasses 20. An elastic member 156 is connected to one of the two clamping plates (152, 153). The elastic member 156 is located in the gap 154. When the multimedia auxiliary apparatus 10 is fixed to the glasses 20, a friction force may be generated between the elastic member 156 of the clamp 150 and the temple 204, to increase a clamping force of the clamp 150 on the temple 204. In some embodiments, more than two elastic members 156 may also be respectively connected to the two clamping plates (152, 153). Two elastic members 140 are located in the gap 154.

As shown in FIG. 4 again, in some embodiments, the speaker module 148 has a sound outlet portion 158. The sound outlet portion 158 has a playing direction. The playing direction is perpendicular to the assembly direction (as shown in FIG. 6, the sound signal is played in a Y-axis direction), so that the sound signal may be played around the ear of the user. In some embodiments, two sound outlet portions (138, 158) are respectively arranged in opposite positions. Both ears of the user may receive sound signals at a same distance.

In some embodiments, when the auxiliary display assembly 104 is implemented by a single multimedia processing module 114 and the projection lens 116 (such as the auxiliary display assembly 104 shown in FIG. 1), the multimedia auxiliary apparatus 10 may also be configured with two clamps (108, 150). For example, the clamp 108 is arranged on the second support 112, and the clamp 150 is arranged on the second support 113. After the multimedia auxiliary apparatus 10 is fixed to the glasses 20, the two clamps 108 may stably fix each of the second supports (112, 113) on two sides of the auxiliary display assembly 104 to the temple 204.

Based on the above, in some embodiments, the multimedia auxiliary apparatus 10 may be fixed to glasses 20 through the clamp 108, so that a user views the image signal projected onto the projection lens 116. After the multimedia auxiliary apparatus 10 is fixed to the glasses 20, the projection lens 116 is arranged at a position corresponding to the spectacle frame 202, so that the user may view the image signal of the projection lens 116 through the glasses. In addition, the speaker module 106 may be arranged adjacent to an ear of the user, so that the user may listen to the sound signal played by the speaker module 106. In this way, the user may fix the multimedia auxiliary apparatus 10 to the glasses 20 when wearing the glasses 20, to obtain the image signal and/or the sound signal to perform an operation of an augmented reality conference.

Certainly, the present invention may have various other embodiments. Without departing from the spirit of the present invention and its essence, a person skilled in the art may make various corresponding changes and modifications according to the present invention, but these corresponding changes and modifications shall fall within the protection scope of the claims appended to the present invention.

What is claimed is:

1. A multimedia auxiliary apparatus, configured to be detachably assembled on glasses, the glasses including a glasses lens, the glass lens has a focal position, comprising:

a frame body, comprising one first support and two second supports, wherein the two second supports are respectively connected to two sides of the first support;

an auxiliary display assembly, fixed to a side of the first support, and comprising:

a multimedia processing module, configured to generate an image signal and a sound signal based on a multimedia signal, the multimedia processing module comprising a projection module, the projection module converting the image signal into a projected image; and a light-transmission lens, configured to receive the projected image, the glasses lens being between the light-transmission lens and the focal position of the glasses lens, so that the projected image is overlapping with an environment picture at the focal position of the glasses lens;

a speaker module, fixed to one of the two second supports and configured to play the sound signal; and a clamp, fixed to one of the two second supports and located between the auxiliary display assembly and the speaker module, the clamp has a gap;

wherein the light-transmission lens extends from the multimedia processing module in an assembly direction, the assembly direction is a direction substantially perpendicular to a plane formed by the two second supports and substantially parallel to the gap, and wherein the light-transmission lens covers a major part of the corresponding glasses lens, so that an optical center of the glasses lens, a center of the light-transmission lens, and the focal position are substantially aligned.

2. The multimedia auxiliary apparatus according to claim 1, wherein the clamp comprises two clamping plates, the gap is defined between the two clamping plates, the gap has the assembly direction.

3. The multimedia auxiliary apparatus according to claim 2, wherein one of the two clamping plates has a signal transmission portion configured to transmit the multimedia signal to the multimedia processing module.

4. The multimedia auxiliary apparatus according to claim 2, wherein an elastic member is connected to one of the two clamping plates, and the elastic member is located in the gap.

5. The multimedia auxiliary apparatus according to claim 2, wherein the speaker module has a sound outlet portion, the sound outlet portion has a playing direction, and the playing direction is perpendicular to the assembly direction.

6. The multimedia auxiliary apparatus according to claim 1, wherein the auxiliary display assembly further comprises:

another multimedia processing module, fixed to an other side of the first support and configured to generate the image signal and the sound signal; and another light-transmission lens, configured to receive a projection of the image signal.

7. The multimedia auxiliary apparatus according to claim 6, further comprising another speaker module, wherein the another speaker module is fixed to the other of the two second supports and is configured to play the sound signal.

8. The multimedia auxiliary apparatus according to claim 7, further comprising another clamp, wherein the another clamp is fixed to the other of the two second supports, and is located between the another multimedia processing module and the another speaker module.

9. The multimedia auxiliary apparatus according to claim 8, wherein the another clamp comprises two clamping plates, a gap is defined between the two clamping plates, the gap has an assembly direction, the light-transmission lens extends from the multimedia processing module toward the assembly direction, and the another light-transmission lens extends from the another multimedia processing module toward the assembly direction.

10. The multimedia auxiliary apparatus according to claim 9, wherein a first distance is defined between the clamp and the multimedia processing module, a second distance is defined between the another clamp and the another multimedia processing module, and the first distance is substantially equal to the second distance.

* * * * *